J. F. O'CONNOR.
FRICTION DRAFT RIGGING.
APPLICATION FILED MAR. 27, 1911.
1,067,837.
Patented July 22, 1913.
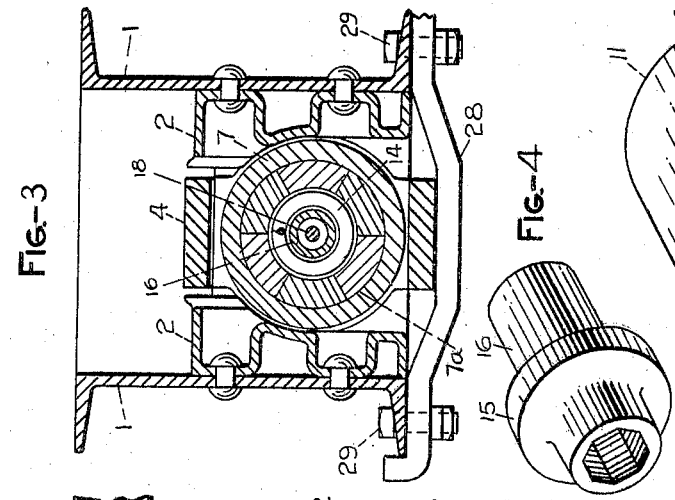
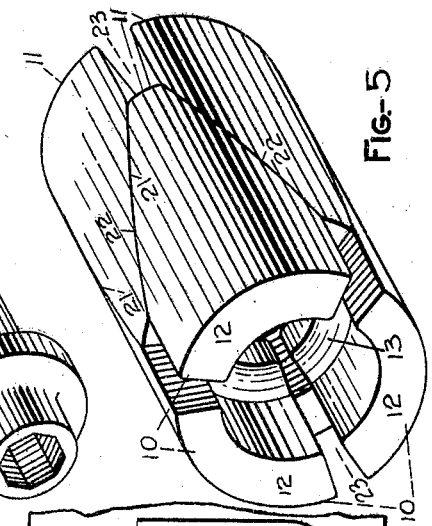
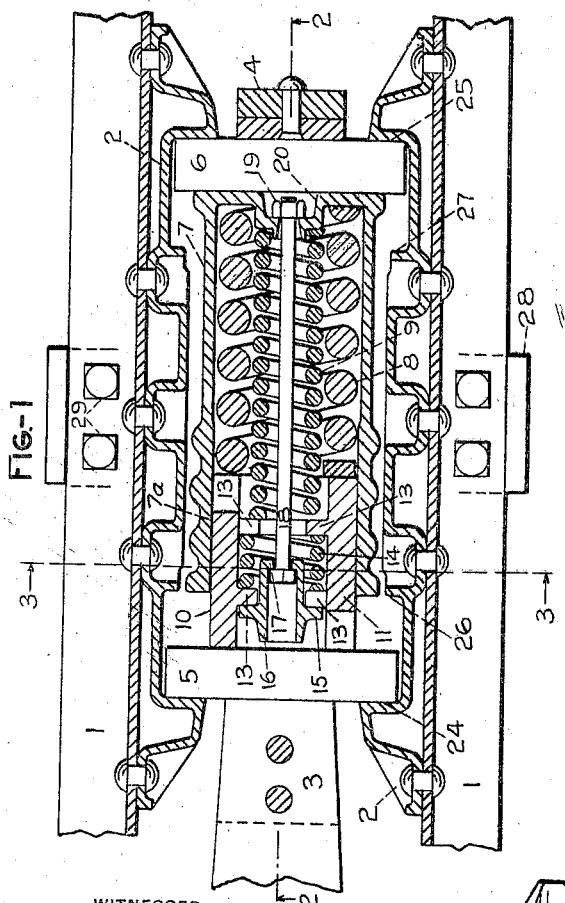
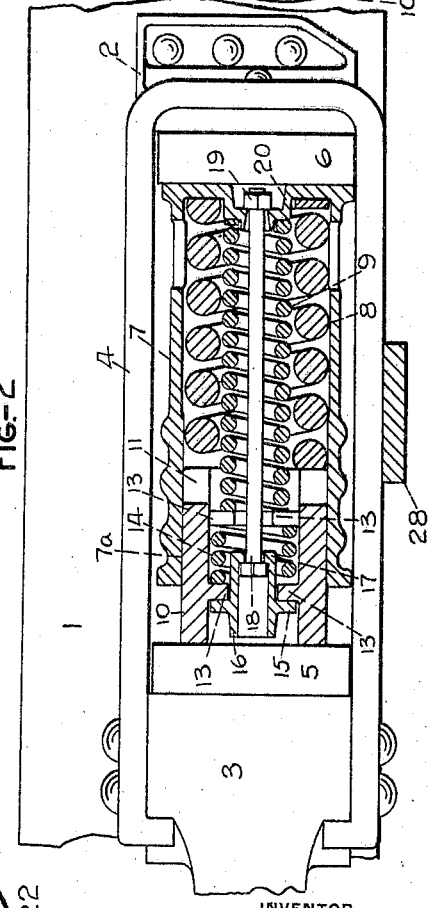
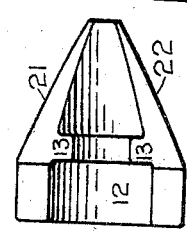
WITNESSES
Calvin B. Patch
Pearl Abrams
INVENTOR
John F. O'Connor
BY Munday, Evarts, Adcock & Clarke
His attorneys.

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

1,067,837. Specification of Letters Patent. Patented July 22, 1913.

Application filed March 27, 1911. Serial No. 617,018.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging.

The object of my invention is to provide a friction draft rigging of a simple, efficient and strong construction, composed of few parts and capable of being cheaply manufactured, and more particularly to provide a friction draft rigging in which the friction shoes may be made of relatively cheap material, such as ordinary white iron castings, and at the same time be free from danger of fracture or injury under the heavy shocks and blows to which the friction draft rigging is subjected in practical use.

My invention consists in the means I employ, and herein shown and described, to practically accomplish this object or result, the same being more particularly pointed out in the claims.

In the accompanying drawing forming a part of this specification, Figure 1 is a plan view, partly in horizontal section, of a friction draft rigging embodying my invention. Fig. 2 is a side elevation, partly in central, vertical, longitudinal section on line 2—2 of Fig. 1. Fig. 3 is a cross section on line 3—3 of Fig. 1. Fig. 4 is a detail, perspective view of the connecting thimble which fits inside the friction shoes. Fig. 5 is a detail perspective view of the friction shoes and Fig. 6 is a plan view of one of the shoes.

In the drawing, 1 represents the center or draft sills of the car frame to which the stop members or castings 2 are secured, 3 the draw-bar, 4 the draft yoke, 5, 6 the front and rear followers, 7 a longitudinally movable friction shell arranged between the followers, 8, 9 springs longitudinally arranged within the friction shell and 10, 11 two sets of oppositely arranged annular segmental wedging friction shoes, each set preferably comprising three segmental wedging shoes 12, all preferably identical in shape or made from the same pattern, and each provided with an annular internal segmental rib 13 to afford bearing for the small short supplemental spring 14 which is interposed between the front set of shoes 10 and the rear set of shoes 11. The segmental ribs 13 on the front set of shoes also afford bearing for the flange 15 of the connecting thimble 16. And the segmental internal ribs 13 of the set of shoes 11 afford a seat or bearing for the front end of the small spring 9 to react against, said small spring 9 being nested within the large spring 8 which reacts at its front end against the rear set 11 of said segmental wedging friction shoes. The connecting thimble or bearing 16 is hollow and furnished with an internal flange 17 for the head of the connecting rod 18 to bear against. The connecting rod 18 is furnished with a threaded nut 19 at its rear end for engagement with the member 20 which closes the rear end of the friction shell 7 and which may, if preferred as illustrated in the drawing, be cast integral with the friction shell. The springs 8, 9 thus react at their rear end against the friction shell and at their front ends against the friction shoes, the larger spring against the rear set of friction shoes and the smaller spring also against the rear set of friction shoes.

Each of the annular segmental friction shoes 12 has two inclined or wedging faces 21, 22; and a clearance space 23 is left between the friction shoes of each set at the larger or base ends of the friction shoes to enable the shoes of each set to properly expand or spread apart under the wedging action of one set of shoes against the other set. The front follower 5 bears against the front ends of the front set of friction shoes and the rear follower 6 against the rear end of the friction shell. As the annular segmental friction shoes of the front set interfit or internest circumferentially with the annular segmental friction shoes of the rear set, and as the wedge faces 21, 22 of the shoes of both sets act circumferentially against the annular segmental shoes of the two sets, the shoes are each and all subjected only to crushing strains and are not subjected at all to breaking strains, and consequently are adapted to be made of relatively cheaper and more fragile material, such as ordinary white iron castings without liability to fracture, and which, being very hard, at the same time affords very efficient and durable friction faces on the shoes for coaction with the internal cylindric friction face 7$^a$ of the malleable iron friction shell 7. The stop members 2 preferably have, in addition to the front stop shoulders 24 and the rear stop shoulders 25, intermediate stop shoulders 26 and 27 for the followers to abut against. The bottom tie plate 28 is removably secured to the draft sills 1 by bolts 29. The connecting thimble 16 and connecting rod 18 serve to hold all the parts in assembled position and also provide means for maintaining the springs under an initial compression and for automatically taking up wear of the friction shell and friction shoes.

Each of the wedge faces 21, 22 of each of the friction shoes 12 of both sets is preferably a spirally twisted wedge face instead of a straight or true plane. That is to say, each wedge face is radial of the friction shell at all points of the length of the wedge face. This gives true and perfect contact between the wedge faces of adjacent shoes throughout the length of the wedge faces. This will be readily understood from Figs. 3 and 6 of the drawing. The radial or spirally twisted wedge faces 21, 22 of the friction shoes also aid, when the shoes are in engagement with each other and with the friction shell, in maintaining the shoes always in proper position and alinement in respect to each other and parallel to the longitudinal axis of the friction shell and to each other.

I claim:—

1. In a friction draft rigging, the combination with the draw-bar, draft yoke, stop members and followers, of a longitudinally movable friction shell, springs within the shell, one nested within the other, front and rear sets of annular segmental wedging friction shoes, the shoes of each set being furnished with internal shoulders, a supplemental spring interposed between the internal shoulders of the two sets of shoes, a connecting thimble bearing against the shoulders of the front set of shoes and a connecting rod for said thimble and friction shell, substantially as specified.

2. In a friction draft rigging, the combination with a longitudinally movable friction shell, a spring and two sets of oppositely arranged annular segmental wedging friction shoes, said spring reacting at one end against the friction shell and at the other end against one set of friction shoes, said shoes having internal shoulders, and a supplemental spring interposed between said internal shoulders, substantially as specified.

3. In a friction draft rigging, the combination with a longitudinally movable friction shell, a spring and two sets of oppositely arranged annular segmental wedging friction shoes, said spring reacting at one end against the friction shell and at the other end against one set of friction shoes, and a further spring nested within said first spring and reacting at one end against the friction shell and at the other end against one set of friction shoes, and a supplemental spring reacting at one end against one set of friction shoes and at the other end against the other set of friction shoes, substantially as specified.

4. In a friction draft rigging, the combination with a longitudinally movable friction shell, a spring and two sets of oppositely arranged annular segmental wedging friction shoes, said spring reacting at one end against the friction shell and at the other end against one set of friction shoes, and a further spring nested within said first spring and reacting at one end against the friction shell and at the other end against one set of friction shoes, and a supplemental spring reacting at one end against one set of friction shoes and at the other end against the other set of friction shoes, the shoes of each set having internal ribs to afford bearings for said supplemental spring, substantially as specified.

5. In a friction draft rigging, the combination with a longitudinally movable friction shell, a spring and two sets of oppositely arranged annular segmental wedging friction shoes, and a connecting thimble and rod for holding said parts assembled and the spring under an initial compression, substantially as specified.

JOHN F. O'CONNOR.

Witnesses:
 PEARL ABRAMS,
 ESTHER MICHAELSEN.

---

Copies of this patent may be obtained for five cents each, by addressing the "Commissioner of Patents, Washington, D. C."